Figure 1:
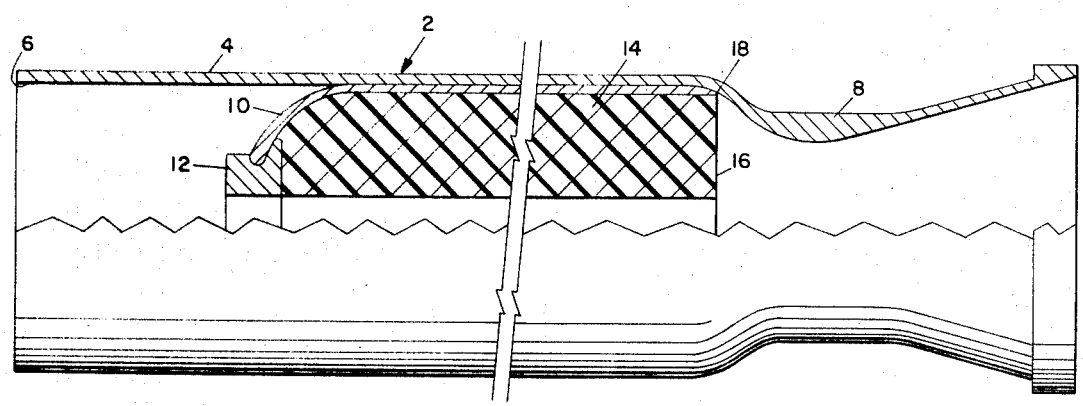

United States Patent [19]

Carter et al.

[11] 3,750,823
[45] Aug. 7, 1973

[54] FILAMENT WOUND VESSEL AND METHOD OF MANUFACTURE

[75] Inventors: Richard P. Carter; Frederick J. Policelli, both of Cumberland, Md.

[73] Assignee: Hercules Incorporated, Wilmington, Del.

[22] Filed: Apr. 15, 1970

[21] Appl. No.: 28,819

[52] U.S. Cl............................ 220/3, 29/450, 29/425, 156/294, 220/83
[51] Int. Cl..... B65d 25/00, B65d 7/42, B29c 27/10
[58] Field of Search.......................... 60/200 A, 255; 220/3, 83; 156/294, 423; 29/450, 525, 463

[56] References Cited
UNITED STATES PATENTS

| | | | |
|---|---|---|---|
| 3,207,352 | 9/1965 | Reinhart, Jr. | 220/83 X |
| 3,508,677 | 4/1970 | Laieson et al. | 220/3 |
| 3,024,936 | 3/1962 | Logue, Jr. | 220/3 |
| 3,238,717 | 3/1966 | Aycock et al. | 60/255 |
| 3,083,864 | 4/1963 | Young | 220/83 |
| 3,282,757 | 11/1966 | Brussee | 220/3 UX |
| 3,073,475 | 1/1963 | Fingerhut | 220/3 |
| 3,074,585 | 1/1963 | Koonitz | 220/3 |
| 3,293,860 | 12/1966 | Stedfeld | 220/83 X |

FOREIGN PATENTS OR APPLICATIONS 902,961   1/1945   France................................. 220/3

Primary Examiner—George E. Lowrance
Attorney—Michael B. Keehan

[57] ABSTRACT

A filament wound cylindrical vessel adapted to withstand internal pressure having an outer shell and an inner shell slidably disposed within the outer shell, said inner shell having a hoop strength to axial strength ratio lower than said outer shell whereby the said inner shell expands more than the outer shell upon application of internal pressure to form a strong frictional bond between the shells. Also includes method of forming shells and combining them to form the vessel.

5 Claims, 2 Drawing Figures

3,750,823

RICHARD P. CARTER
FREDERICK J. POLICELLI
INVENTOR

BY *William F. Smith*

AGENT

FILAMENT WOUND VESSEL AND METHOD OF MANUFACTURE

This invention relates to filament wound vessels and more particularly to rocket motor cases and like vessels and their method of manufacture.

A rocket motor case commonly comprises a vessel closed at one end and open at the other to which a nozzle is attached. A gas, generated within the motor at elevated pressure, exits through the nozzle and imparts a thrust in the opposite direction. This vessel or rocket chamber must have sufficient integrity to withstand the internal gas pressure. The present invention relates to a design and method of manufacture of a rocket case which has several economic and performance advantages over existing types. The invention is more specifically directed to small rocket cases made of composite materials.

Small rocket cases are usually made with a full diameter opening at one end or the other, the reason for this being to facilitate loading or casting of the propellant charge into its casing. Metals such as high strength steel have been used for the most part to make these cases. However, composite materials, usually fiberglass bonded together with a resin, have been used to some extent for the small cases and to a considerably wider extent for large casings. The advantages of the latter for small and large casings reside in cost saving generally.

Composite rocket cases have been made with full openings. However, rather heavy or bulky and expensive metal closures are employed, which may be either screwed, bolted, riveted, pinned or keyed together. Other techniques provide for bonded together composite type rocket cases. With these techniques a short section of one part is smaller in diameter than the other, the two parts slide together and are held in place with an adhesive. A considerable amount of time, material, and effort are needed to join these parts. Similarly, pressure bottles and pressure tanks have been manufactured as composite structures and, accordingly, this invention is directed to filament wound cylindrical vessels generally which are adapted to withstand internal pressure from whatever source.

Generally described, the present invention contemplates a filament wound cylindrical vessel adapted to withstand internal pressure comprising an outer shell, and an inner shell slidably disposed within the outer shell, said inner shell having a hoop strength to axial strength ratio lower than said outer shell whereby the said inner shell expands more than the outer shell upon application of internal pressure to form a strong frictional bond between the shells. As a preferred embodiment thereof the inner shell is loaded with rocket propellant and the outer shell includes a rocket nozzle to essentially provide a rocket motor.

Moreover, the present invention includes the method for manufacture of the aformentioned pressure vessel and rocket motor.

Figure 2:
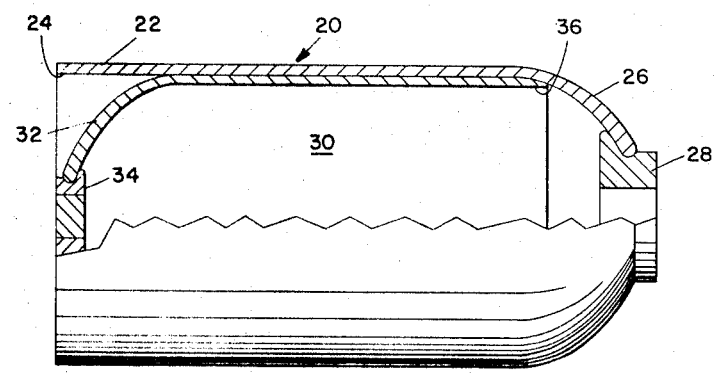

Embodiments of the invention have been chosen for purposes of illustration and description and are shown in the accompanying drawings wherein:

FIG. 1 is a longitudinal, part sectional and part elevational view of a gas-generating device in the form of a cylindrical rocket motor illustrating the application of the invention; and FIG. 2 is a longitudinal, part sectional and part elevational view of a cylindrical vessel adapted to withstand internal pressure illustrating the application of the invention.

Referring now to FIG. 1, a rocket motor 2 has an outer shell 4 having the fore end with a full diameter opening 6 and having the aft end terminating as a rocket nozzle 8 integrally wound with the outer shell 4. An inner shell 10 has the fore end thereof forming a closure with an adapter 12 for receiving an igniter (not shown) and has a propellant 14 disposed therein. The inner shell 10 with its components 12 and 14 is slidably disposed within the outer shell 4 by engaging the full diameter aft end 16 of the inner shell 10 with the full diameter fore end 6 of the outer shell 4 and sliding the inner shell 10 thereinto until its aft end engages the necked down portion 18 of the rocket nozzle 8. This places the fore end closure of the inner shell adjacent the fore end full opening of the outer shell.

It is well known that the stress in the circumferential mode of a rocket casing or other vessel under pressure is twice that of the longitudinal stress. The winding of a composite pressure vessel can be performed to a proper advantage by building into the design the required balanced strength, i.e., twice as strong in girth as in length. This has been disclosed by R. E. Young in U.S. Pat. No. 3,083,864.

The strength of a given winding in the girth or hoop direction is a function of the $\sin^2$ of the winding angle, whereas the longitudinal or axial strength is a function of the $\cos^2$. Therefore, the designer of a filament wound composite structure can vary the strength in a given direction by changing the winding angle or use relative amounts of layers wound at different angles. The $\sin^2$ of the angle 54¾° is twice that of its $\cos^2$. Therefore, a vessel wound with this angle would be balanced. A winding angle of 45° has equal strength in each direction. Therefore, a combination of one part of a 45° winding and one-half an amount of a 90° winding would be balanced.

Hoop Strength: $\sin^2 45°$ plus ½ $\sin^2 90°$ = 1.00

Axial Strength: $\cos^2 45°$ plus ½ $\cos^2 90°$ = 0.50

In practice for rocket motors a ratio of hoop to axial strength of less than 2 is employed to overcome the cylinder to dome discontinuity.

With reference to the foregoing and to FIG. 1, Owens-Corning S/904 glass fiber with an epoxy resin was used, and 288 ends to the inch per layer was applied. The inner shell 10 was wound with seven layers at 28° plus about one-half layer at 90° producing a hoop to axial strength ratio of 0.38 to 1. The outer shell 4 was wound with six layers at 38° plus six at 90°. The strength ratio of this shell was 2.22 to 1. Rocket motors made with the aforementioned windings were loaded with conventional propellant and successfully fired.

It will be seen therefore that this invention provides for the manufacture of the inner shell of the two-part rocket chamber with a lower hoop to axial strength ratio than the outer part. Upon pressurization the inner shell expands more readily than the outer. For optimum design the coefficient of friction for the materials used can be obtained and this calculated with the area of contact involved gives the strength ratio unbalance needed. Taking these factors into account no adhesive is required to bond the inner and outer shells.

Referring now to FIG. 2, a cylindrical vessel 20 adapted to withstand internal pressure has an outer shell 22 with one end thereof with a full diameter opening 24. The other end thereof forms a closure 26 having an adapter 28 for receiving a valve body or conduit (not shown). An inner shell 30 has one end thereof forming a closure 32 in combination with a plugged pole piece 34 adjacent the opening 24 of the outer shell 22. The other end of the inner shell 30 has a full diameter opening 36 adjacent the closure 26 of the outer shell 22. The inner shell 30 is slidably disposed within the outer shell 22 in the same manner as described for the rocket motor of FIG. 1. The winding of the shells and determination of desired hoop to axial strength and frictional coefficients are likewise determined.

It will be seen, therefore, that the method for manufacture of the pressure vessels of this invention comprises forming an outer shell having one end open by winding filamentary material and providing a predetermined ratio of hoop strength to axial strength, forming an inner shell having one end open by winding filamentary material to slidably engage the outer shell and to provide a ratio of hoop strength to axial strength less than that of the outer shell, and sliding the open end of the inner shell into the open end of the outer shell whereby a strong frictional bond between the shells is obtained upon the application of internal pressure to the vessel and expansion of the internal shell.

It will be appreciated that although glass filaments and epoxy resin have been used in the examples of this invention that other filamentary material may be used including carbon filaments and boron filaments with epoxy or other resin systems.

The usual tool or mandrel for winding composite pressure vessels consists of one which will dissolve, disintegrate or come apart after the item is cured. The present invention makes possible the use of a simple, solid or permanent mandrel. Two half-shells are fabricated on such a suitable mandrel which when cured are parted and the two halves slipped off over the mandrel ends. Using such a solid and very accurate mandrel makes possible an accurate inside diameter tolerance. The outside diameter will vary somewhat depending on materials and conditions but usually will be within 5 percent of the shell wall thickness. The inner shell, therefore, must be machined or ground in a centerless grinder on the outside to a very accurate tolerance to produce the zero to slight interference fit of the two parts.

Another advantage of this invention is such that the outer shell can be made longer than the inner shell. Thus, after assembly, the extra length of the outer shell affords a convenient attachment stub or skirt to fasten, for example, a rocket to a warhead. This invention also applies to composite pressure vessels other than rockets, such as, gas storage cylinders, bottles and tanks. In this case, the slightly extended outer shell makes a convenient base for upright support as particularly depicted in FIG. 2.

Still other advantages of this invention are that it makes possible composite rockets or pressure vessels which are much simpler to make, load and assemble than those of the prior art. Generally, the prior art has employed elaborate means of injecting an adhesive into a carefully machined cavity or the like to bond the two halves of a composite vessel together. However, this and similar methods are time consuming and expensive to perform. The instant invention reduces the closure effort to its ultimate simplicity, i.e., pressing together two open ended shells. For permanence in the unpressurized state a thin film of adhesive may be wiped on the outside of the inner shell before assembly. Therefore, the advantage of large composite rocket cases, namely, lighter weight, less expensive and no missile hazard, can be extended to smaller rocket units and pressure vessels.

What I claim and desire to protect by Letters Patent is:

1. A filament wound cylindrical vessel adapted to withstand internal pressure comprising:
    a. an outer shell having a full diameter opening at one end thereof and a closure at the other end thereof, and
    b. an inner shell disposed within the outer shell and having an external diameter slightly smaller than the internal diameter of said outer shell, said inner shell having a closure at one end thereof adjacent to the opening of the outer shell and a full diameter opening adjacent to the closure of the outer shell, said inner shell having a hoop strength to axial strength ratio lower than that of said outer shell so that upon application of internal pressure, said inner shell expands more than the outer shell to form a strong frictional bond between the shells.

2. A filament wound cylindrical vessel adapted to withstand internal pressure comprising:
    a. an outer shell having a full diameter opening at the fore end thereof and having the aft end thereof adapted to include a rocket nozzle, and
    b. an inner shell disposed within the outer shell and having an external diameter slightly smaller than the internal diameter of said outer shell, said inner shell having the fore end thereof forming a closure and having a full diameter opening at the aft end thereof adapted for loading rocket propellant into the inner shell, said inner shell having a hoop strength to axial strength ratio lower than that of said outer shell so that upon application of internal pressure, said inner shell expands more than the outer shell to form a strong frictional bond between the shells.

3. in the method for the manufacture of a filament wound cylindrical vessel, adapted to withstand internal pressure, the improvement which comprises
    a. forming an outer shell having one end open by winding filamentary material and providing a predetermined ratio of hoop strength to axial strength,
    b. forming an inner shell having an external diameter slightly less than the internal diameter of said outer shell and having one end open by winding filamentary material and providing a ratio of hoop strength to axial strength less than that of the outer shell, and
    c. sliding the open end of the inner shell into the open end of the outer shell so that upon the application of internal pressure to the vessel, the inner shell expands and a strong frictional bond between the shells is obtained.

4. The method as in claim 3 in which a thin film of adhesvie is applied to the inner shell prior to slidable engagement of the inner and outer shells.

5. The method as in claim 3 in which rocket propellant is loaded into the inner shell through its open end prior to slidable engagement of the inner and outer shells.

* * * * *